United States Patent [19]

Berg

[11] 4,302,161
[45] Nov. 24, 1981

[54] WAVE PUMP APPARATUS

[76] Inventor: John L. Berg, c/o Jeannine Barriault, 1530 Lafayette St., Longueuil, Quebec, Canada, J4K 3B7

[21] Appl. No.: 81,013

[22] Filed: Oct. 1, 1979

[51] Int. Cl.³ .............................................. F03B 13/12
[52] U.S. Cl. ....................................... 417/333; 60/498; 60/501; 60/505
[58] Field of Search ................. 417/330, 331, 333, 61; 60/495, 498, 497, 501, 505

[56] References Cited

U.S. PATENT DOCUMENTS

| | | | |
|---|---|---|---|
| 610,013 | 8/1898 | Armstrong et al. | 417/333 |
| 1,540,364 | 6/1925 | Roldan | 60/505 |
| 2,109,173 | 2/1938 | Herndon | 417/333 |
| 3,335,667 | 8/1967 | Murphy | 417/331 X |
| 3,957,398 | 5/1976 | Lloyd | 417/331 |
| 3,989,951 | 11/1976 | Lesster et al. | 417/330 X |

Primary Examiner—Richard E. Gluck
Attorney, Agent, or Firm—Swabey, Mitchell, Houle, Marcoux & Sher

[57] ABSTRACT

A wave pump apparatus includes a number of upstanding cylinders connected together by a subframe. Each cylinder mounts a float on the outside of the cylinder connected to a piston within the cylinder. The upstanding cylinders are spaced approximately a distance of half of an average wave length of a particular wave pattern such that as certain floats are moving upwardly, other floats are moving downwardly. Each cylinder is connected to a chamber at the bottom thereof with an inlet valve and an outlet valve, such that as the piston in the cylinder is moving upwardly, it will draw in water, and as the piston moves downwardly in the cylinder, it will pump the water.

1 Claim, 7 Drawing Figures

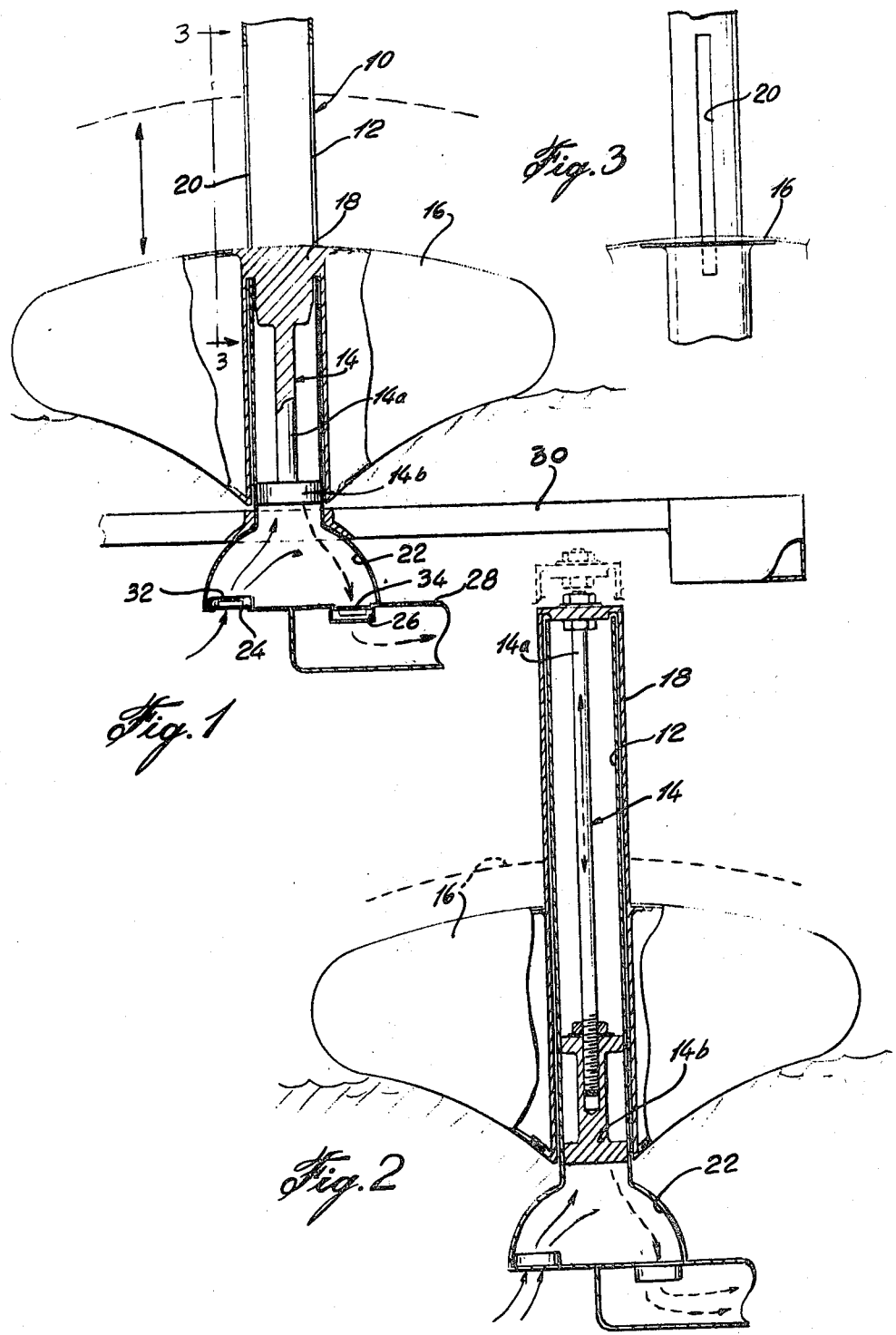

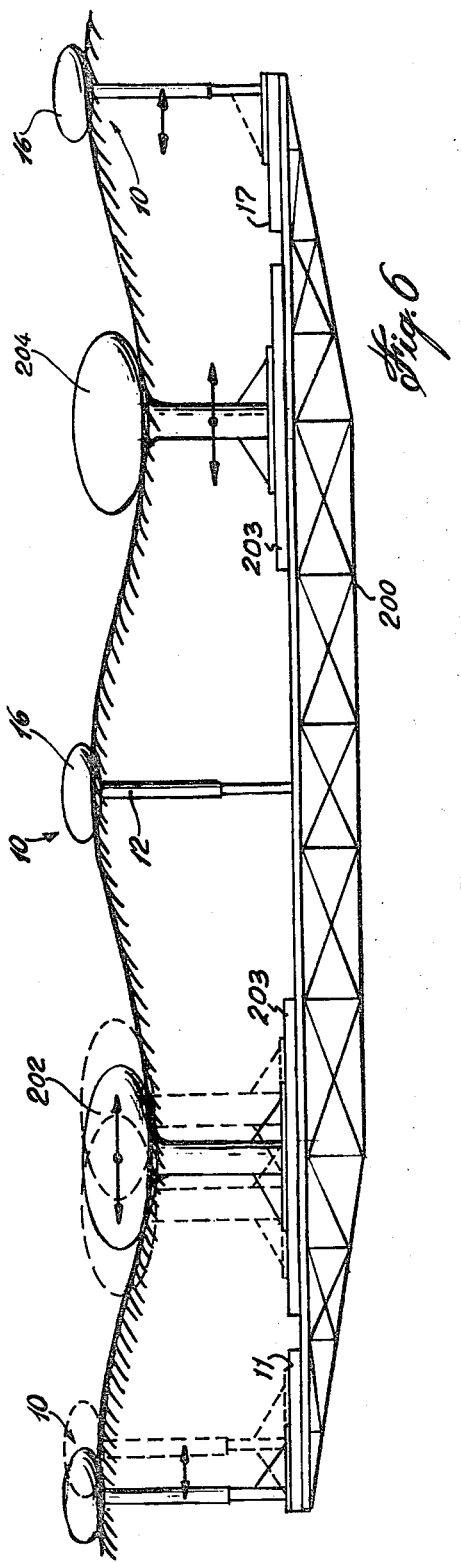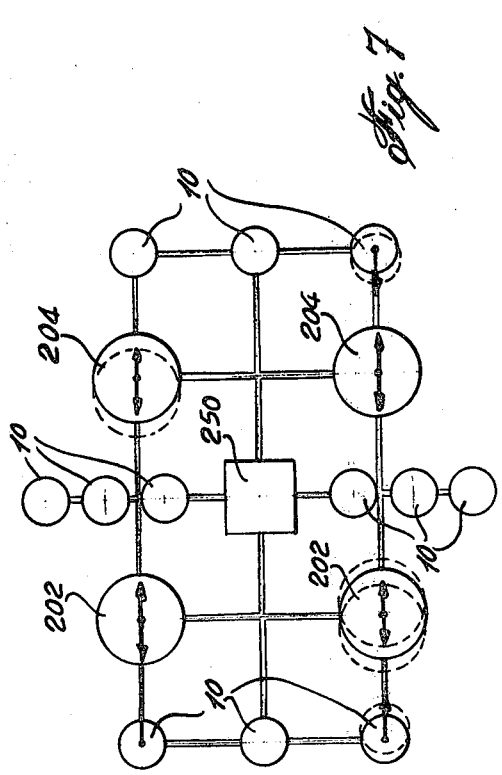

WAVE PUMP APPARATUS

BACKGROUND OF THE INVENTION

1. Field of the Invention

Said invention relates to an apparatus for converting energy from wave motion to useful forms of energy such as mechanical or electrical.

2. Description of the Prior Art

There have been numerous developments in the field of utilization of wave motion. An example is U.S. Pat. No. 610,013, issued Aug. 30, 1898. In that patent a vertical cylinder and piston is provided, the piston being connected to a float adapted to follow the varying levels of a body of water caused either by tides or by wave motion. As the float is raised by the wave motion or by tide motion, the piston and the cylinder moves upwardly acting as a pump for pumping water from the body of the water to a higher level where the water can be stored for conversion into other types of energy such as for turning a generator.

SUMMARY OF THE INVENTION

It is an aim of the present invention to provide an improved system for converting the energy derived from wave motion into useful energy.

It is a further aim of the present invention to provide a system whereby wave pumps of the type described in U.S. Pat. No. 610,013 can be used with other elements to provide a commercially useful energy converter.

A construction in accordance with the present invention includes a frame of the submersible type with floats mounted on. At least a pair of floats are provided which are spaced apart one from the other a distance approximating the average wave length of a particular wave pattern. The floats are adapted to be moved relative to each other depending on the wave length of a wave pattern on the body of water. A plurality of wave are provided on the frame with each wave pump including a vertical cylinder, and a piston movable in the cylinder. A float on the exterior of the cylinder is directly connected to the piston, and a chamber communicates with the bottom of the cylinder including a one-way valve provided at an inlet into the chamber allowing water to be drawn into the chamber as the piston is moved upwardly in the cylinder. A second one-way valve is provided at the outlet of the chamber to allow water to flow through the outlet when the piston is moved downwardly in the cylinder.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a fragmentary cross-sectional view of a typical pump in accordance with the present invention;

FIG. 2 is a view similar to FIG. 1, showing a different embodiment of the pump;

FIG. 3 is a fragmentary elevational view of the detail of the pump shown in FIG. 1, taken along line 3—3 thereof.

FIG. 6 is a schematic side elevation of another embodiment of the present invention; and FIG. 7 is a schematic top plan view of the device shown in FIG. 6.

DESCRIPTION OF THE PREFERRED EMBODIMENT

Figure 4:
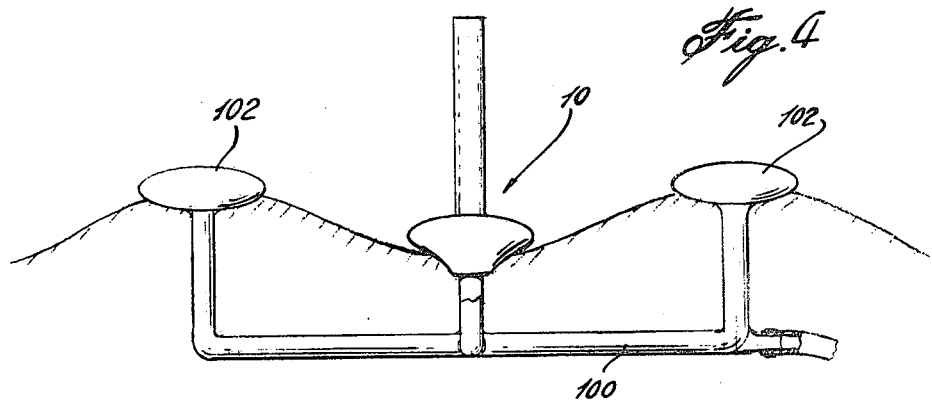
FIG. 4 is a schematic view of one embodiment of the submersible frame including floats and a water pump in accordance with the present invention.

Referring now to FIGS. 1 to 3, there is shown a typical water pump including a cylinder and a typical water pump 10 including a cylinder 12, a piston 14 and a float 16.

In the case of FIG. 1, the float 16 includes a bore to allow the cylinder 12 to pass therethrough with a bridging member 18 connected directly to the piston 14 through slots 20 provided in the side of the cylinder 12 as shown in FIG. 3. The piston 14 includes a piston rod 14a and a piston head 14b, the bottom of the cylinder 12 communicates with a chamber 22. Chamber 22 includes an inlet 24 and an outlet 26 which communicates with a discharge pipe 28.

In operation, the cylinder 12 would be fixed to a submersible frame 30. As a wave passes the device, the float 16 floats upwardly with the level of the water on the wave thus pulling the piston 14 upwardly causing water to enter the chamber 22 through the inlet 24 and the valve 32. Valve 32 is a one-way valve and a similar valve 34 is provided at the outlet. The water will of course be drawn into the cylinder 12 partly up the cylinder and since the valve 34 would in this case be closed, no water would be seeping back from the discharge pipe 28. As the wave passes the device, of course the float moves downwardly with the level of the water forcing piston 14 to push the water in the chamber 22 through the outlet 26 and thus through the valve 34 and into the discharge pipe 28.

In a different embodiment as shown in FIG. 2, the float 16 is connected to the piston 14 by means of a bridge device 18 connected at the top of the cylinder 12 by means of a rod 14a to the piston 14 including piston head 14b. The operation of the pump shown in FIG. 2 is identical to that described with respect to FIG. 1.

Figure 5:
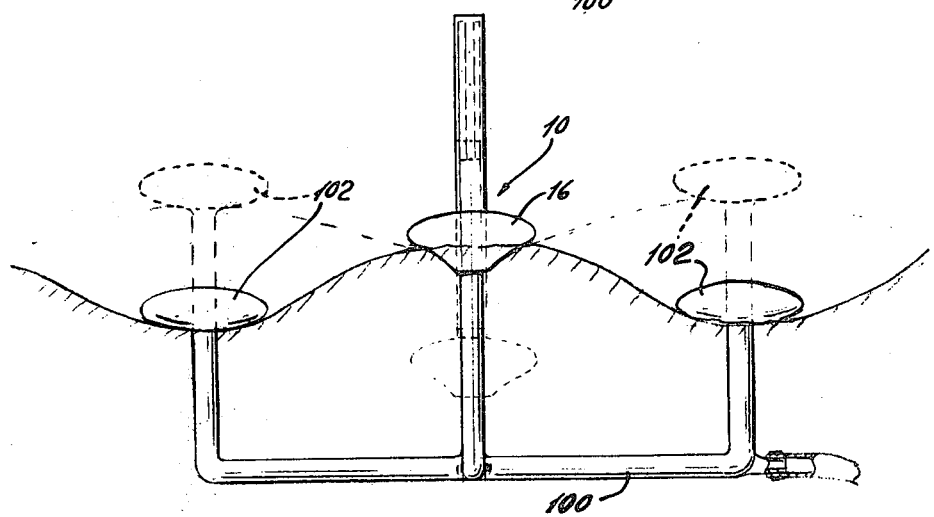
FIG. 5 is a similar view of FIG. 4, showing the device in a different operative position.

On the other hand, a structure such as shown in FIGS. 4 to 5 and FIGS. 6 to 7, might include a submersible frame 100 which includes a pair of floats 102 and mounting a plurality of water pumps 10 as described in FIGS. 1 to 3. The floats 102 which are fixed to the submersible frame 100 are placed apart a distance equal to the average wave length or a multiple thereof of a particular wave pattern common in a particular area. The floats 102 would be on the crest of the waves while the floats 16 of the water pumps 10 would be in the valleys between the waves and vice versa. The water being pumped by the water pump can be passed to a higher level reservoir for storing hydroelectric energy.

FIGS. 6 and 7 show a more sophisticated version of a submersible frame 100. The frame of FIG. 6 as identified is 200 and includes an open steel structure with plenty of open spaces between the beams and struts to allow water to pass freely. The frame 200 includes floats 202 and 204 spaced apart longitudinally the average distance of the average wave length of a wave as a multiple of a particular wave pattern. The floats 204 for instance, could be mounted on tracks 203 and adjustable relative to the floats 202 to be synchronized with a particular wave length at any given time. As shown in the drawings floats 202 could likewise be adjustable on tracks 203.

A plurality of wave pumps 10 are mounted to the frame 200 as shown in the drawings of FIGS. 6 and 7. Each of the wave pumps 10 can be adjusted on tracks 11 provided on the frame 200 so that it is exactly a half wave length from the floats 202 and 204 so that as in the earlier described embodiments, the float 16 of the wave pump 10 will be at the crest or valley of the waves when the floats 202 and 204 are respectively at the valley or crest of the waves. Likewise float 16 can be adjusted in relative distance from the float 204 by moving it along track 17.

A generating unit 250 is provided on the frame 200 for generating electricity or other forms of energy and would be in communication with the individual water pumps 10.

It should be noted that the effective height of the floats 202 and 204 above the frame should be approximately the height of the waves, such that when the floats 202 and 204 are riding respective crests of waves, the frame is still submersed below the level of the valleys to allow the floats 16 on the wave pumps 10 to reach their full bottom stroke. Of course the cylinders 12 of the water pumps 10 must be high enough such that, when the floats 202 and 204 are in the valleys, the cylinders 12 still project above the wave crest.

I claim:

1. A wave pump apparatus comprising a frame of the submersible type, floats mounted on the frame and adapted to float the frame, the floats including at least a pair thereof which are spaced apart one from the other a distance approximating the average wave length of a particular wave pattern, the floats being adapted to be moved relative to each other depending on the wave length of a wave pattern on the body of water, a plurality of wave pumps provided on the frame, each wave pump including a cylinder, a piston movable in the cylinder, a float on the exterior of the cylinder directly connected to the piston, chamber means communicating with a bottom of the cylinder including a one-way valve provided at an inlet into the chamber allowing water to be drawn into the chamber as the piston is moved upwardly in the cylinder, a second one-way valve provided at an outlet of the chamber to allow water to flow through the outlet when the piston is moved downwardly in the cylinder, the plurality of water pumps being spced approximately one half wave length from the floats on the frame such that the floating portion of the wave pump is at the crest of a wave when the floats are in the respective valleys of waves and vice versa.

* * * * *